United States Patent
Roll et al.

(10) Patent No.: US 8,746,419 B2
(45) Date of Patent: Jun. 10, 2014

(54) METHOD FOR OPERATING A BRAKING SYSTEM, BRAKING SYSTEM AND MOTOR VEHICLE HAVING A BRAKING SYSTEM

(75) Inventors: Georg Roll, Huesenstamm (DE); Jochen Leideck, Roßdorf (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 244 days.

(21) Appl. No.: 13/262,532

(22) PCT Filed: Mar. 26, 2010

(86) PCT No.: PCT/EP2010/053982
§ 371 (c)(1),
(2), (4) Date: Nov. 18, 2011

(87) PCT Pub. No.: WO2010/115729
PCT Pub. Date: Oct. 14, 2010

(65) Prior Publication Data
US 2012/0090928 A1   Apr. 19, 2012

(30) Foreign Application Priority Data

Apr. 6, 2009 (DE) .......................... 10 2009 002 211
Mar. 25, 2010 (DE) .......................... 10 2010 003 232

(51) Int. Cl.
*F16D 65/14*   (2006.01)
(52) U.S. Cl.
USPC ........... 188/106 R; 188/156; 188/162; 701/78
(58) Field of Classification Search
USPC ........... 188/106 R, 72.6–72.9, 156, 157, 158, 188/159–162, 163, 164; 701/70, 78, 83
See application file for complete search history.

(56) References Cited

U.S. PATENT DOCUMENTS

| | | | | |
|---|---|---|---|---|
| 7,992,691 | B2 * | 8/2011 | Maron et al. ................. | 188/156 |
| 2007/0114843 | A1 * | 5/2007 | Kawahara et al. ............ | 303/122 |
| 2008/0296106 | A1 * | 12/2008 | Nilsson ........................ | 188/156 |

FOREIGN PATENT DOCUMENTS

| | | |
|---|---|---|
| DE | 100 10 735 A1 | 1/2001 |
| DE | 102 12 612 A1 | 10/2003 |
| DE | 10 2008 024 180 A1 | 12/2008 |
| DE | 10 2008 033 309 A1 | 4/2009 |
| EP | 1 967 434 A1 | 9/2008 |
| EP | WO 2009/013193 A1 | 1/2009 |
| EP | WO 2009/053429 A1 | 4/2009 |

OTHER PUBLICATIONS

International Search Report—PCT/EP2010/053982—Aug. 10, 2010.

* cited by examiner

*Primary Examiner* — Pamela Rodriguez
(74) *Attorney, Agent, or Firm* — Brinks Gilson & Lione

(57) ABSTRACT

A method for operating a braking system in a motor vehicle having at least two wheel brakes (54, 56), each of which can be activated by an electromechanical actuator of the self-locking type. Each wheel brake having a locking device for implementing a parking brake functionality, in which the locking device and respective electromechanical actuator is actuated and locked by the locking device when a parking brake function is carried out. A first method step is carried out in which the at least two actuators are actuated in succession and a second method step is carried out in which it is checked whether the at least two actuators have achieved respectively predefined brake application force. In the event of the at least two actuators having achieved the respectively predefined brake application force, the at least two actuators are locked in a third method step.

15 Claims, 3 Drawing Sheets

METHOD FOR OPERATING A BRAKING SYSTEM, BRAKING SYSTEM AND MOTOR VEHICLE HAVING A BRAKING SYSTEM

CROSS REFERENCE TO RELATED APPLICATIONS

This application claims priority to German Patent Application No. 102009002211.2, filed Apr. 6, 2009, German Patent Application No. 10 2010 003 232.8, filed Mar. 25, 2010, and PCT International Patent Application No. PCT/EP2010/053982, filed Mar. 26, 2010.

FIELD OF THE INVENTION

The invention relates to a method for operating a braking system, in particular a braking system in a motor vehicle, having at least two wheel brakes, each of which can be activated by an electromechanical actuator, in particular a non-self-locking actuator, and which each comprise a locking device for implementing a parking brake functionality, in which locking device the respective electromechanical actuator is firstly actuated and then locked by the locking device. In addition, the invention relates to an associated braking system and a motor vehicle having such a braking system.

BACKGROUND AND PRELIMINARY DESCRIPTION OF THE INVENTION

In order to implement a parking brake functionality in motor vehicles, two actuators of the service brake are usually secured by means of a suitable device. In order to arrest the vehicle, a brake application force is applied via actuators of the service brake, and the service brake is subsequently locked mechanically. The provision of the brake application force requires power which has to be made available by the on-board power system. The largest amount of power is not required here for holding the brake application force which is to be set but rather for accelerating the masses and moving the brake components. If two electromechanical actuators are driven simultaneously, the electrical power which is to be applied is multiplied.

If the vehicle then only has a an on-board electrical power system with compromised functionality (e.g. weak battery) and a request for the activation of the parking brake function occurs, simultaneous activation of both electromechanical actuators can lead to a failure of the on-board power system. In the text which follows it will be assumed that the vehicle has, by way of example, two electromechanical actuators which implement the parking brake function.

In order to reduce the electrical power which has to be applied it is possible that the two actuators which implement the parking brake function are respectively actuated and locked in succession. This means that firstly the first actuator is actuated and locked, and the second actuator is then actuated and locked.

This approach can lead to the following disadvantageous situation in the case of a low power on-board power system or one which has been compromised in its functioning. The motor vehicle may be located, for example, on an incline which is so large that the mass of the vehicle cannot be held by one parking brake alone. In order to save the on-board power system, a first parking brake is initially locked. Before the second parking brake can be locked, the on-board power system could fail, with the result that the power which is necessary to release the already locked parking brake is also no longer available.

In this situation, the vehicle cannot be held on the slope by the one locked parking brake. At the same time, the driver can no longer move the vehicle while just one parking brake is locked. In the worst case, the car therefore begins to slip in an uncontrolled fashion. Such a situation can cause serious injury to persons and material damage. Furthermore, in such a state the vehicle cannot be towed away by another motor vehicle, for example using a towing cable or a towing bar.

The present invention is therefore based on the object of making available a method for operating a braking system which reliably prevents the occurrence of a state of a motor vehicle in which the motor vehicle is neither securely arrested nor maneuverable. Furthermore, the invention is to specify an associated braking system in which such a method is to be carried out, as well as a motor vehicle having such a braking system.

With respect to the method of this invention, the above-mentioned object is achieved in that when a parking brake function is carried out, a first method step is carried out in which the at least two actuators are actuated in succession, and subsequently a second method step is carried out in which it is checked whether the at least two actuators have achieved a respectively predefined brake application force, and in the event of the at least two actuators having achieved a respectively predefined brake application force, the at least two actuators are locked in a third method step.

The invention is based on the idea that an indispensable safety requirement of modern motor vehicles is that they can be arrested or parked in a reliable way. In particular, on steep slopes or on a precipitous underlying surface it is necessary for the parking brake or parking brake function which is provided for this purpose to secure the motor vehicle against slipping away. At the same time, a malfunction of the parking brake must not lead to a situation in which the vehicle becomes (to a limited degree) incapable of being maneuvered or controlled.

In modern motor vehicles, increasing use is being made of electromechanical brakes (brakes which can be activated electromechanically), in which an electrically driven actuator (for example in the form of an electric motor) applies the brake. The electrical power which is required for the application of the brake is drawn from the on-board electrical power system.

In such braking systems there is then the risk that in the case of a weak on-board power system, the on-board power system will fail before all the brakes can be satisfactorily applied and locked. This can have the result, as mentioned above, that a motor vehicle is inadequately secured against slipping away, and when a slipping process occurs, persons in the surrounding area are put at risk.

As has now been recognized, the above-described state can be avoided by virtue of the fact that only a minimum possible power is required in the on-board power system at any time during the arresting process if the actuators are successively actuated. Therefore, only power for a single brake application process is required at one time. Furthermore, by checking the brake application force before the locking step, it is possible to avoid individual actuators being locked even though they have not reached the required brake application force. In the event of a possible failure of the on-board power system into such a situation, the actuators can then no longer be released and the vehicle is incapable of being maneuvered and at the same time is not securely arrested.

In the event that not all the actuators have achieved a predefined brake application force, all the actuators are advantageously released or opened in a third step. As a result, it is possible to avoid the motor vehicle starting to rotate and/or slip since, for example, if only one brake is satisfactorily applied and cannot alone hold the motor vehicle. As a result of the release of the brakes, it is possible to ensure that the driver can move the motor vehicle and can arrest it securely at another position, for example by engaging a gearshift.

When all the actuators have reached the predefined brake application force, in the third step locking devices are preferably activated essentially simultaneously, as result of which the motor vehicle is as quickly as possible in a locked and secured state.

In order to prevent undesired sudden and hazardous braking of a moving motor vehicle, the parking brake function is advantageously carried out only when the motor vehicle is essentially in the stationary state. The stationary state of the motor vehicle may be detected, for example on the basis of the signals of wheel-speed sensors which are mounted on the wheels of the motor vehicle.

The predefined brake application force is advantageously selected to be essentially the same for all the actuators and here is preferably in a range from 5 kN to 30 kN, in particular in certain applications from 10 kN to 25 kN.

In one preferred embodiment of the method for a motor vehicle having an on-board power system in accordance with this invention, the on-board power system of the motor vehicle is checked while the parking brake application function is being carried out.

Checking of the on-board power system proves advantageous since electrical power, which has to be made available by the on-board power system, is necessary for producing the brake application force of the actuators. The greatest power is not required here for maintaining the brake application force which is to be set (the predefined brake application force), but rather for accelerating the masses and setting brake components into motion (for example the components of an electric motor). Checking the on-board power system therefore already provides conclusive information, before the actual brake application processes, as to whether under certain circumstances it is possible to obtain enough power to simultaneously satisfactorily actuate and lock the actuators.

If the checking of the on-board power system has revealed that its function is compromised, the respective method steps illustrated above are advantageously executed and otherwise, that is to say if the on-board system is not compromised, replaced by a single method step in which all the actuators are essentially simultaneously actuated and locked in a normal application process. In the case of a fully functionally capable on-board power system, it is possible in this way to easily and quickly park or arrest the motor vehicle. If, on the other hand, the on-board power system's function is compromised, the steps of the method are executed according to which the actuators are successively actuated, their brake application force is checked and then, if appropriate, the actuators are locked.

In the case of sequential actuation of the actuators, in each case only the power for a single actuator is required from the on-board power system. The simultaneous actuation of, for example, two actuators would, in a first approximation, require twice the power compared with operating one. The sequential actuation of the actuators can therefore also be successful if the on-board power system can make available just a proportion of its power which is available in the normal state. If the on-board power system fails before all the actuators have reached the required brake application force, the situation is therefore prevented in which the vehicle is only incompletely arrested and, for example, starts to slip on a slope, as a result of only some of the actuators being locked.

In the case of an on-board power system which has failed, it is possible, on the other hand, that the actuators which have already been locked can no longer be released, with the result that the vehicle cannot be brought under control.

With respect to the braking system, the above-mentioned objective is achieved according to the invention in that said braking system comprises a control device, connected on the signal side to the wheel brakes, for actuating the actuators and the locking devices.

The control device is advantageously embodied as a brake control device and actuates the electromechanical actuators in order to execute a service brake function.

With respect to the motor vehicle with an on-board power system, the above-mentioned objective is achieved according to the invention by a braking system as represented above.

In one preferred embodiment, the control device comprises an on-board power system checking module which is electrically connected to the on-board power system of the motor vehicle. In combination or as an alternative thereto, the control device is connected on the signal input side to an on-board power system checking device which is electrically connected to the on-board power system.

In one advantageous embodiment, the motor vehicle comprises a front axle and a rear axle and two electromechanical wheel brakes which are assigned to the rear axle and each comprise a locking device for implementing the parking brake functionality, and two hydraulic brakes which are assigned to the front axle.

BRIEF DESCRIPTION OF THE DRAWINGS

An exemplary embodiment of the invention will be explained in more detail with reference to a drawing, in which, in each case in a highly schematic illustration.

DETAILED DESCRIPTION OF THE INVENTION

Figure 1:
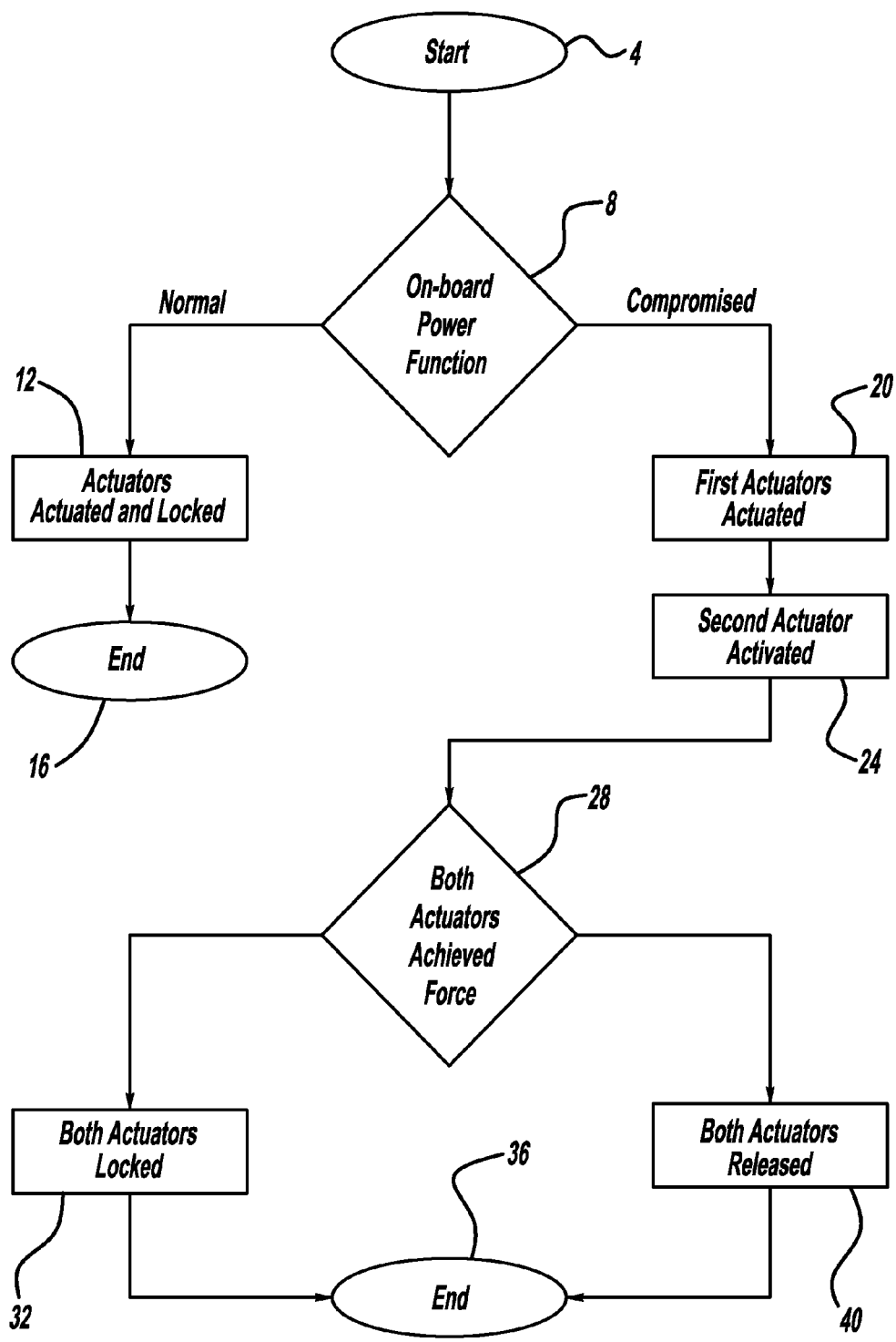
FIG. 1 shows a flowchart of a method in a preferred embodiment of the invention.

Identical parts are provided with the same reference symbols in all the figures.

The method according to the invention for operating a braking system in a preferred embodiment will be explained with reference to the flowchart illustrated in FIG. 1. The braking system described is to be installed in a motor vehicle of this example having two actuators which can be activated electromechanically and make available a parking brake function by means of a locking mechanism.

The method starts as Start 4, at which the driver of the motor vehicle carries out a parking brake function. In operation of block 8, it is checked whether the on-board power system of the motor vehicle is sufficiently functionally capable and is functionally satisfactory, i.e. whether the (electrical) power can be retrieved for simultaneous activation of all the actuators.

If this is the case and the power system is not compromised (i.e. normal), in block 12 the two actuators are actuated and locked simultaneously, and the method ends as End 16.

If this is the not the case and the power system is compromised, in block 20 the first actuator is firstly actuated to the desired (predefined) brake application force, but not locked.

Then, in block 24 the second actuator is actuated to the desired brake application force but not locked. As a result of the sequential actuation of the two actuators, only the power for the actuation of precisely one actuator is required during each brake application process. This ensures that the parking brake of the motor vehicle can be used even in the case of a weak on-board power system.

If the on-board power system fails after the actuation of the first actuator in Block 20, the motor vehicle is still nevertheless capable of being maneuvered since it has not yet been locked at this time. Non-self-locking actuators are advantageously used in this embodiment. It is usually not possible to release the actuator when the on-board power system fails.

In decision block 28 it is then checked whether both actuators have reached or implemented the predefined required brake application force. If this is the case, in block 32 both actuators are locked simultaneously. If this is not the case, in block 40 both actuators are released. The motor vehicle is in fact in a nonsecured state in which secure arresting can be ensured. The driver of the motor vehicle can then drive to an alternative parking location or, if appropriate, look for a garage. In both cases, the method is ended at end 36.

The invention also relates to a method for operating a braking system, in particular for a motor vehicle, having at least two wheel brakes, each of which can be activated by an electromechanical actuator, in particular a non-self-locking actuator, and which each comprise a locking device for implementing a parking brake functionality, in which locking device the respective electromechanical actuator is firstly actuated and then locked by the locking device, wherein when a parking brake function is carried out the actuators are firstly activated in succession, and either activation of a locking device is not carried out until both actuators are activated, in particular to a predefined brake application force, or the locking device of the actuator which is activated first is locked before the other activator is activated. The second case is advantageous in particular when the on-board power system of the motor vehicle is functioning satisfactorily.

The braking system 50 (illustrated in FIG. 2) of a motor vehicle (not illustrated) comprises two electromechanical brakes (EMB) 54 and 56. The two EMBs 54 and 56 each comprise a service brake actuator 60 and 64 and a locking device in the form of a parking brake actuator 68 and 72. The actuators 60 and 68, and 64 and 72 are each driven by EMB control devices 76 and 80 via EMB signal lines 74. The service brake actuators 60 and 64 advantageously each comprise an electric motor and at least one transmission arranged downstream of the electric motors. The illustration of the actuators 60, 64, 68, and 72 is purely schematic and does not give any conclusive information about the size or spatial arrangement of the actuators 60, 64, 68, and 72.

Figure 2:
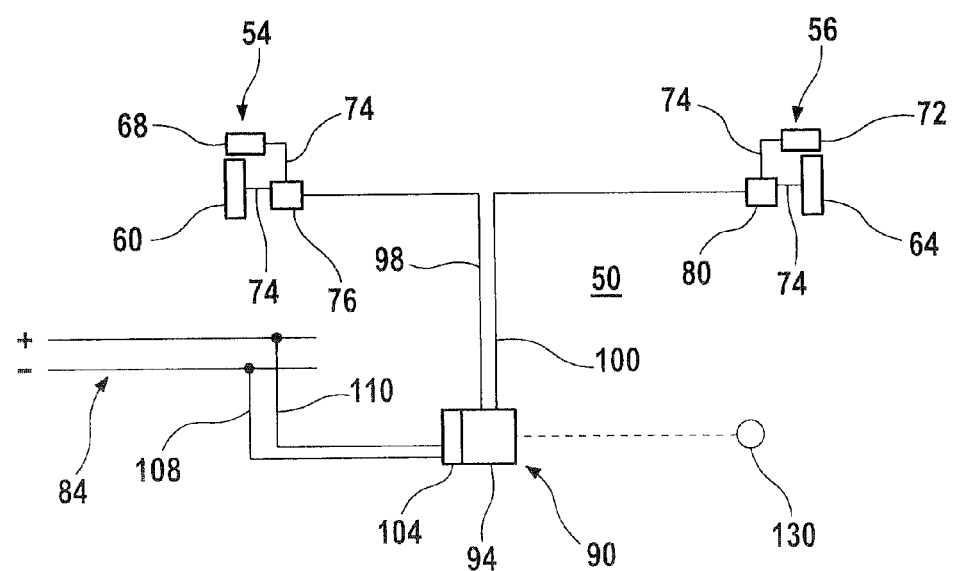
FIG. 2 shows a braking system having two wheel brakes, a control device in which a method according to FIG. 1 is processed, as well as an on-board power system of a motor vehicle.

FIG. 2 also illustrates an on-board power system 84 of the motor vehicle, which is not a component of the braking system 50.

The braking system 50 comprises a control device 90, which is embodied as a brake control device. The control device 90 comprises a control module 94, which is connected on the signal input side and signal output side to the EMB control device 76 via a control signal line 98, and to the EMB control device 80 via control signal line 100. The control device 90 also comprises an on-board power system checking module 104, which is electrically connected to the on-board power system (storage batter and electrical bus) 84 via connecting lines 108 and 110, and essentially comprises a voltage checking module which checks the voltage of the on-board power system 84. Module 104 is also connected to a parking brake operator control 130 on the signal input side (illustrated by a dashed connecting line).

During the usual driving mode of the motor vehicle, when there is a braking request by the driver the EMB control devices 76 and 80 are driven via the control module 94 of the control device 90, which EMB control devices 76 and 80 in turn transmit corresponding signals to the service brake actuators 60 and 64, the signals causing the service brake actuators 60 and 64 to apply the brake in accordance with the driver's braking request. The control device 90 is usually connected to further service brakes of the motor vehicle on the signal side, which service brakes can be of hydraulic or electromechanical design (two independent brake circuits are legally prescribed). The connection to further brakes is not illustrated in FIG. 2.

The method which is illustrated in FIG. 1 is implemented in the control device 90 by means of software and/or hardware. The control device 90 is embodied, for example, as a microcontroller, microprocessor or application-specific circuit (application specific integrated circuit or "ASIC"). If the driver of the motor vehicle expresses a wish to activate the parking brake or parking brake function by activating the parking brake control element 130, the on-board power system checking module 104 checks the state of the on-board power system 84, for example, by checking of the voltage which is present or applied. The checking of the state of the on-board power system 84 advantageously also takes place essentially continuously during the execution of the parking brake function. If the on-board power system 84 is functioning satisfactorily, this information is communicated from the on-board power system checking module 104 to the control module 94. The control module 94 subsequently causes, in each case via the associated EMB control devices 76 and 80, the service brake actuators 60 and 64 to apply the respective brake 54 and 56, and the parking brake actuators 68 and 72 to lock the respective brakes 54 and 56.

If the checking of the on-board power system 84 reveals that the function of the on-board power system 84 is compromised and/or that the full power cannot be retrieved, the control module 94 successively (sequentially) drives the EMB control devices 76 and 80 and instructs them to apply the respective EMBs 54 and 56 using the respective service brake actuator 60 and 64. For example, the EMB control device 76 is driven first and then the EMB control device 80.

As an alternative to this, both EMB control devices 76 and 80 can also be driven essentially simultaneously, wherein, for example, the particular service brake actuator 60 or 64, respectively, is first driven by the EMB control device 76 and then by the EMB control device 80 after a predefined delay. The control device 94 respectively transmits a predefined brake application force to the EMB control devices, which brake application force is stored, by way of example, in the control device 90 in a persistent memory, or which is calculated from the ambient conditions.

After both EMBs 54 and 56 have been applied, the control module 90 checks, through communication with the EMB control devices 76 and 80, whether the predefined brake application force has been respectively reached. If both EMBs 54 and 56 have been applied with the predefined brake application force, the control device 90 or control module 94 brings about, through signal-side communication with the EMB control devices 76 and 80, the (preferably essentially simultaneous) locking of the EMBs 76 and 80 by the parking brake actuators 68 and 72. The arresting process of the motor vehicle is therefore ended and the motor vehicle is securely arrested.

If the desired brake application force has not been reached, the control module 94 drives the EMB control devices 76 and 80 to release the service brake actuators 60 and 64. The driver of the motor vehicle can then move the motor vehicle to a suitable location for secure arresting.

The control module 94 and the on-board power system checking module 104 can also be implemented in an integrated form as a common module. A module for checking the on-board power system can also be provided separately from the control device 90 as an on-board power checking device and can communicate with the control device 90 by means of signals.

Figure 3:
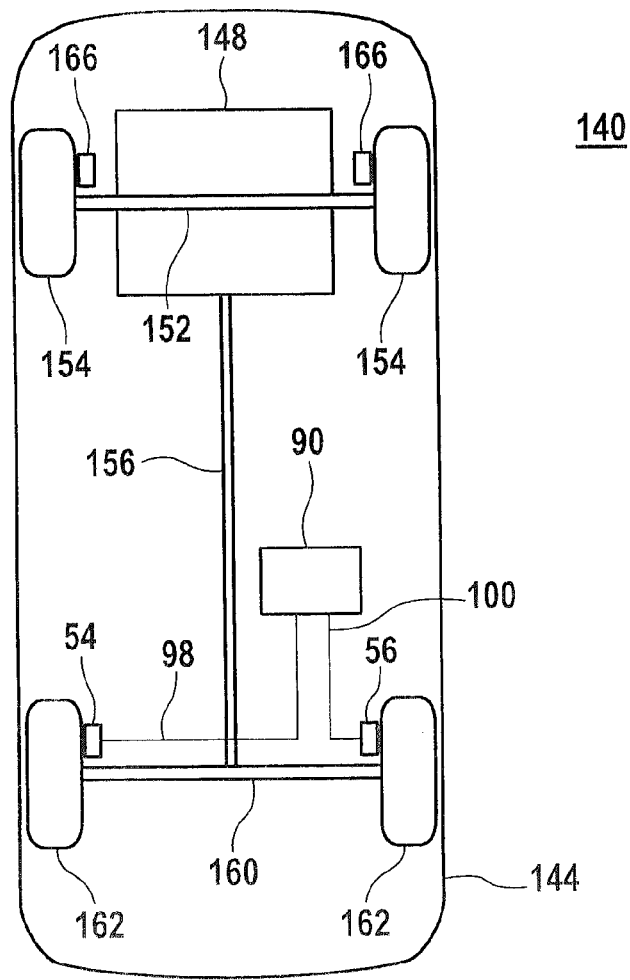
FIG. 3 shows a motor vehicle having a braking system according to FIG. 2.

The motor vehicle 140 which is illustrated in FIG. 3 comprises a vehicle bodywork 144, an engine block 148, a front axle 152 with two front wheels 154 and a rear axle 160 which is driven by a Cardan shaft 156 and has two rear wheels 162. The front wheels 154 are each equipped with a hydraulic brake 166.

The motor vehicle 140 is equipped with the braking system 50 according to FIG. 2, wherein in FIG. 3 only the essential components are indicated. These include the EMBs 54 and 56 with which the rear wheels 162 are equipped, as well as the control device 90 which is connected by control signal lines 98 and 100 to the EMBs 54 and 56 or to the EMB control devices 76 and 80 thereof.

The motor vehicle 140 which is illustrated in FIG. 3 is configured, by virtue of its equipment with the braking system 50, for particularly secure operation, in particular in the case of arresting and parking processes.

While the above description constitutes the preferred embodiment of the present invention, it will be appreciated that the invention is susceptible to modification, variation, and change without departing from the proper scope and fair meaning of the accompanying claims.

The invention claimed is:

1. A method for operating a braking system (50) in a motor vehicle (140), having at least two wheel brakes (54, 56), each of which can be activated by one of at least two electromechanical actuators of a non-self-locking type, and which each of the at least two actuators have a locking device for implementing a parking brake function, in which the locking device of the respective electromechanical actuator is firstly actuated and then locked by the locking device, comprising; in that when the parking brake function is carried out,
    a first method step is carried out in which the at least two actuators are actuated in succession,
    and subsequently a second method step is carried out in which it is checked whether the at least two actuators have achieved a respectively predefined brake application force, and
    in the event of the at least two actuators having achieved the respectively predefined brake application force, the at least two actuators are locked in a third method step by activating the locking devices.

2. The method as claimed in claim 1, wherein, in the event of all of the at least two actuators not having achieved the predefined brake application force, all of the at least two actuators are released in a fourth method step occurring after the second method step.

3. The method as claimed in claim 2 for the motor vehicle (140) having an on-board electrical power system (84), wherein when the parking brake function is carried out, the on-board power system (84) of the motor vehicle (140) is checked in a fifth method step occurring before the first method step.

4. The method as claimed in claim 3, wherein, if the fifth method step has revealed that the function of the on-board power system (84) is compromised, the first, the second, the third, and the fourth method steps are executed, and where the function of the on-board power system is not compromised the first and the second method steps are replaced by the third method step in which all of the at least two actuators are essentially actuated simultaneously and locked.

5. The method as claimed in claim 1, wherein in the third method step the locking devices are essentially activated simultaneously.

6. The method as claimed in claim 1, wherein the parking brake function is carried out only if the motor vehicle (140) is essentially in a stationary state.

7. The method as claimed in claim 1, wherein the predefined brake application force is selected to be essentially the same for all of the at least two actuators and is in a range from 5 kN to 30 kN.

8. The method as claimed in claim 1, wherein the predefined brake application force is selected to be essentially the same for all of the at least two actuators and is in a range from 10 kN to 25 kN.

9. A braking system (50) in a motor vehicle (140), having at least two wheel brakes (54, 56), each of which can be activated by one of at least two electromechanical actuators of a non-self-locking actuator type, and which each of the at least two actuators have a locking device for implementing a parking brake function, in which the locking device of the respective electromechanical actuator is at least activated, and then locked by the locking device, the braking system (50) comprising:
    a control device (90) connected on a signal side to the wheel brakes, for actuating the at least two actuators and the locking devices, in which the control device (90) carries out a series of method steps including a first method step in which the at least two actuators are actuated in succession, and subsequently a second method step is carried out in which it is checked whether the at least two actuators have achieved a respectively predefined brake application force, and
    in the event of the at least two actuators each having achieved the respectively predefined brake application force, the at least two actuators are locked in a third method step.

10. The braking system (50) as claimed in claim 9 wherein the control device further carries out a fourth step occurring after the second method step in the event of all of the at least two actuators not having achieved the predefined brake application force, wherein all of the at least two actuators are released.

11. The braking system (50) as claimed in claim 9, wherein the control device (90) is embodied as a brake control device and actuates the at least two electromechanical actuators in order to execute a service brake function.

12. A motor vehicle (140) having an on-board power system (84) and having the braking system (50) as claimed in claim 9.

13. The motor vehicle (140) as claimed in claim 12, wherein the control device (90) comprises an on-board power system checking module (104) which is electrically connected to the on-board power system (84).

14. The motor vehicle (140) as claimed in claim 12, wherein the control device (90) is connected on the signal side to an on-board power system checking device which is electrically connected to the on-board power system (84).

15. The motor vehicle (140) as claimed in claim 12, having a front axle (152) and a rear axle (160) and the two wheel brakes (54, 56) are assigned to the rear axle (160) and further comprising two hydraulic brakes (166) which are assigned to the front axle (152).

* * * * *